(12) United States Patent
Palmer et al.

(10) Patent No.: US 6,990,628 B1
(45) Date of Patent: Jan. 24, 2006

(54) METHOD AND APPARATUS FOR MEASURING SIMILARITY AMONG ELECTRONIC DOCUMENTS

(75) Inventors: Michael E. Palmer, San Francisco, CA (US); Gordon G. Sun, Redwood Shores, CA (US); Hongyuan Zha, San Mateo, CA (US)

(73) Assignee: Yahoo! Inc., Sunnyvale, CA (US)

(*) Notice: Subject to any disclaimer, the term of this patent is extended or adjusted under 35 U.S.C. 154(b) by 653 days.

(21) Appl. No.: 09/333,121

(22) Filed: Jun. 14, 1999

(51) Int. Cl.
*G06F 15/00* (2006.01)
*G06F 17/00* (2006.01)
*G06F 17/21* (2006.01)

(52) U.S. Cl. .................. 715/500; 715/501.1; 707/3; 707/6

(58) Field of Classification Search .................. 707/3, 707/6, 500, 501.1
See application file for complete search history.

(56) References Cited

U.S. PATENT DOCUMENTS

| | | | | |
|---|---|---|---|---|
| 5,745,893 A | * | 4/1998 | Hill et al. | 707/5 |
| 5,799,292 A | * | 8/1998 | Hekmatpour | 706/11 |
| 5,835,905 A | * | 11/1998 | Pirolli et al. | 707/3 |
| 5,895,470 A | * | 4/1999 | Pirolli et al. | 707/102 |
| 5,920,859 A | * | 7/1999 | Li | 707/5 |
| 5,931,907 A | * | 8/1999 | Davies et al. | 709/218 |
| 5,960,422 A | * | 9/1999 | Prasad | 707/2 |
| 6,052,676 A | * | 4/2000 | Hekmatpour | 706/11 |
| 6,112,203 A | * | 8/2000 | Bharat et al. | 707/5 |
| 6,115,718 A | * | 9/2000 | Huberman et al. | 707/102 |
| 6,128,606 A | * | 10/2000 | Bengio et al. | 706/10 |
| 6,182,066 B1 | * | 1/2001 | Marques | 707/5 |
| 6,182,091 B1 | * | 1/2001 | Pitkow et al. | 707/501.1 |
| 6,282,549 B1 | * | 8/2001 | Hoffert et al. | 707/104.1 |
| 6,321,220 B1 | * | 11/2001 | Dean et al. | 707/3 |
| 6,338,060 B1 | * | 1/2002 | Washizawa | 707/5 |

(Continued)

OTHER PUBLICATIONS

Hermann Kaindl, Stefan Kramer, Luis Miguel Afonso, Combining Structure Search and Content Search for the World-Wide Web, Proceedings of the Seventh ACM Conference on Hypertext and Hypermedia, pp. 217-224 (1998).*

(Continued)

*Primary Examiner*—William Bashore
(74) *Attorney, Agent, or Firm*—Marcel K. Bingham; Hickman Palermo Truong & Becker LLP

(57) ABSTRACT

A method and apparatus are provided for determining when electronic documents stored in a large collection of documents are similar to one another. A plurality of similarity information is derived from the documents. The similarity information may be based on a variety of factors, including hyperlinks in the documents, text similarity, user click-through information, similarity in the titles of the documents or their location identifiers, and patterns of user viewing. The similarity information is fed to a combination function that synthesizes the various measures of similarity information into combined similarity information. Using the combined similarity information, an objective function is iteratively maximized in order to yield a generalized similarity value that expresses the similarity of particular pairs of documents. In an embodiment, the generalized similarity value is used to determine the proper category, among a taxonomy of categories in an index, cache or search system, into which certain documents belong.

34 Claims, 7 Drawing Sheets

U.S. PATENT DOCUMENTS

| | | | |
|---|---|---|---|
| 6,360,215 B1 * | 3/2002 | Judd et al. | 707/3 |
| 6,389,436 B1 * | 5/2002 | Chakrabarti et al. | 707/513 |
| 6,397,212 B1 * | 5/2002 | Biffar | 707/5 |
| 6,405,188 B1 * | 6/2002 | Schwartz et al. | 707/3 |
| 6,418,431 B1 * | 7/2002 | Mahajan et al. | 707/4 |
| 6,418,432 B1 * | 7/2002 | Cohen et al. | 707/5 |
| 6,446,099 B1 * | 9/2002 | Peairs | 707/517 |

OTHER PUBLICATIONS

Ron Weiss, Bienvenido Vélez, Mark A. Sheldon, HyPursuit: A Hierarchical Network Search Engine That Exploits Content-Link Hypertext Clustering, Proceedings of the Seventh ACM Conference on Hypertext, pp. 180-193 (1996).*

* cited by examiner

TABLE 1 – EXAMPLE CONTENTS OF LOG

Time, User ID, Location Identifier

14-Feb-1999 08:01:22, 255.1.2.254, http://www.inktomi.com/index.html

14-Feb-1999 08:01:23, 199.22.131.44, http://www.mwe.com/

14-Feb-1999 08:01:26, 255.1.2.254, http://www.inktomi.com/products

14-Feb-1999 08:01:27, 199.22.131.44, http://www.mwe.com/bios

14-Feb-1999 08:01:31, 255.1.2.254, http://www.inktomi.com/products/trafficserver.html 14-Feb-1999 08:01:32, 199.22.131.44, http://www.mwe/com/bios/palec.htm

[etc.]

FIG. 6

METHOD AND APPARATUS FOR MEASURING SIMILARITY AMONG ELECTRONIC DOCUMENTS

FIELD OF THE INVENTION

The present invention generally relates to data processing. The invention relates more specifically to determining whether an electronic document is similar to another among a large collection of such documents that are maintained by, for example, an indexing system or search-and-retrieval system.

BACKGROUND OF THE INVENTION

Hypertext systems now enjoy wide use. One particular hypertext system, the World Wide Web ("Web"), provides global access over public packet-switched networks to a large number of hypertext documents. The Web has grown to contain a staggering number of documents, and the number of documents continues to increase. The Web has been estimated to contain at least 450 million pages and is expected to expand exponentially over the foreseeable future.

The number of documents available through the Web is so large that to use the Web in a practical way almost always requires a search service, search engine, or similar service. The search engines use "spider" programs that "crawl" to Web servers around the world, locate documents, index the documents, and follow hyperlinks in those documents to yet other documents. When a search query is entered, the search engine locates relevant documents and displays a set of search results that satisfy the query.

There is a fixed upper limit to the number of documents that a user is willing or able to review before fatigue or frustration result. For example, most people are unwilling to review more than 20–100 documents in a set of search results. Accordingly, most search engines now use relevance criteria when selecting electronic documents to be placed in the search results. Using the relevance criteria, the search engine attempts to determine which of the documents in its index are most relevant to the search query. Normally the search results are presented in a list that is ranked by relevance. Use of relevance criteria is critical to enable the search engine to return to the user a reasonable number of electronic documents that are reasonably related to the query. Otherwise, the user would be unable to locate anything relevant among the millions of documents available online. Unfortunately, current technology does not provide a very sophisticated way to determine relevance.

In contrast, Web documents can be classified into a taxonomy of categories and presented in a browsable directory structure. Such a structure is particularly well-suited to easy navigation by novice users. In the past, classification of documents into categories has been carried out manually by large staffs of human classifiers. An example of a directory that uses such an approach is the Yahoo! search system. Clearly, there is a need for a way of leveraging human inputs to automatically classify large numbers of online electronic documents into a taxonomy of categories.

Extensive research has been done in the use of text analysis to classify text documents into categories. In the past few years, however, the number of text documents available online has grown sufficiently large that traditional text analysis approaches are inadequate. Many parties have worked with varied success at analyzing the text contents of electronic documents in order to classify them.

New approaches exploiting hyperlink structure of the Web are addressing this problem. For example, the CLEVER project of the IBM Almaden Research Center, San Jose, Calif. is developing a search engine and directory engine This work is based on the Hypertext Induced Topic Search process developed by Jon Kleinberg. Generally, in this process, a standard text search engine generates a Training Set of electronic documents that match a query subject or category. The process extends the Training Set to include all documents pointing to or pointed to by each document in the Training Set. Using information that describes the links between the documents, the process seeks the best Authorities and Hubs that match the query or category. Mathematically, the Authorities and Hubs are the principal Eigenvectors of matrices representing the link relations between the documents.

In another approach, the GOOGLE project uses a process of generating PageRanks. PageRanks are iteratively updated based on linked hypertext structures. The resulting PageRanks measure the general connectedness of documents on the Web, without regard to a particular category or query. The assumption is that more connected documents will tend to be of general interest to most users.

Both these approaches rely mathematically on the convergence of a similarity value to the principal Eigenvectors of the link matrices. The speed of convergence depends on the Eigenvalue ratio of the principal Eigenvector to the non-principal Eigenvectors. In the worst case, in which the absolute value of the ratio is close to "1", iterations of the process can lead to oscillations between different Eigenstates. In that case, the interpretation of Authorities, Hubs, and PageRanks becomes indefinite, or at least slow to converge.

Accordingly, in this field there is a need for a system or mechanism that can iteratively improve the relevance scores of a result set of electronic documents using generalized similarities among electronic documents, without necessitating convergence to Eigenvectors.

There is also a general need for a system that can automatically determine whether one electronic document is similar to another electronic document, and that can create and store a numeric value that identifies the relative similarity of the electronic documents.

There is also a need for a way to automatically classify an electronic document in taxonomy of categories or classifications that are maintained by a document indexing system or search system.

There is a particular need for a way to combine multiple data sources to result in a more meaningful measure of the similarity of electronic documents.

SUMMARY OF THE INVENTION

The foregoing needs and objects, and other needs and objects that will become apparent from the following description, are addressed by the present invention, which comprises, in one aspect, a method and system that measures similarity of documents in a hypertext document system, by combining multiple types of indications of similarity of the documents. Each type of document similarity is represented by a separate graph of links. The graphs are combined into a combined graph representing generalized similarity of the documents. From this combined graph, the system computes a measure of document similarity. The measure of document similarity may be used to classify unclassified documents into category nodes of a taxonomy structure associated with a hypertext search system. The system uses the measure of document similarity, in combination with a comparison of a set of pre-classified training set of documents with a set of unclassified documents, to carry out classification.

Other aspects of the invention will become apparent from the following description and the appended claim.

The invention also encompasses a computer-readable medium, system, and apparatus that may be configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 is a diagram showing TABLE 1, which depicts an example of the possible contents of a log.

DETAILED DESCRIPTION OF THE PREFERRED EMBODIMENT

Figure 1:
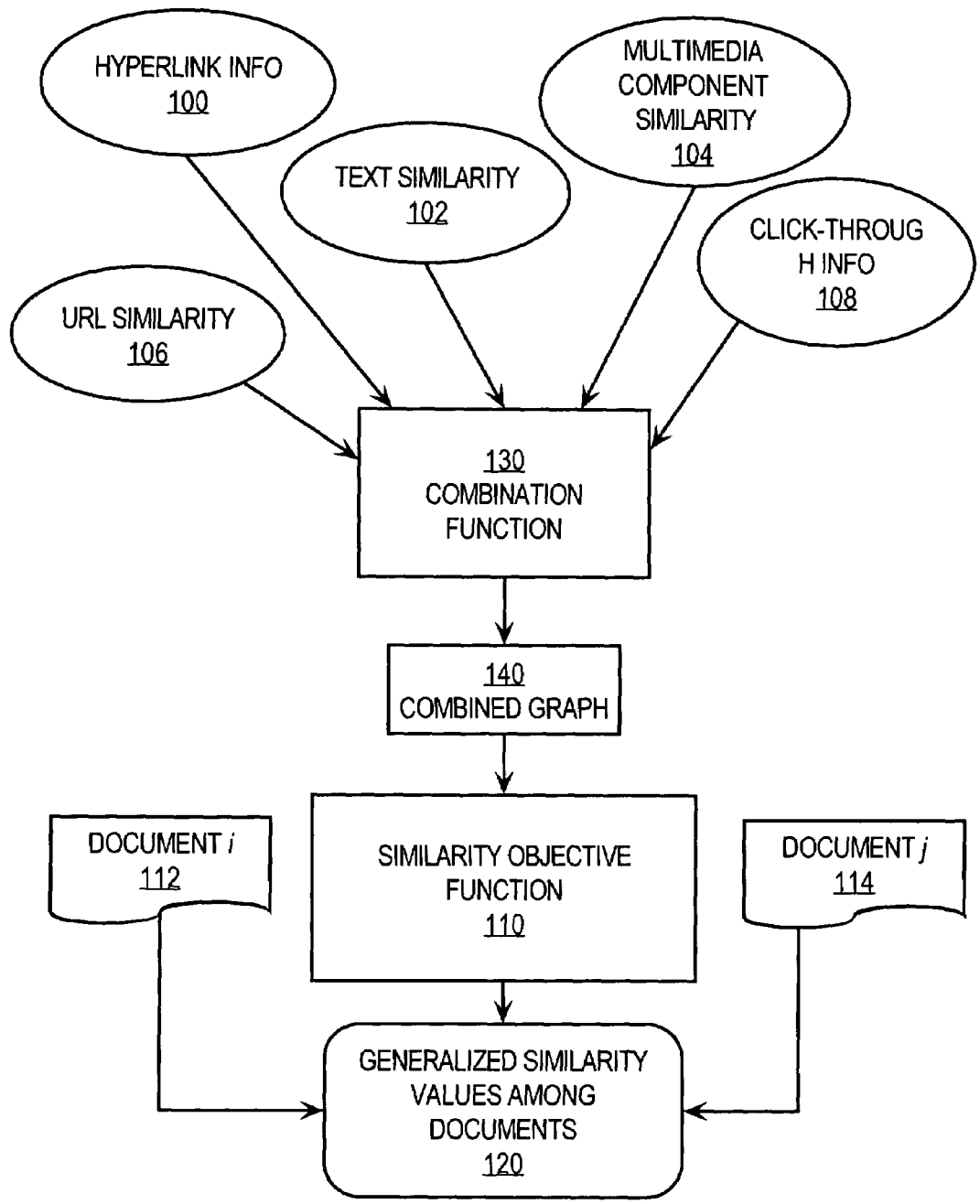
FIG. 1 is a block diagram of sources of similarity information.

A method and apparatus for determining when electronic documents are similar is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview of Generalized Document Similarity Process

In a preferred embodiment, a process of similarity reinforcement iteratively improves the score of a document using the generalized similarity among two or more electronic documents.

While link information from hypertext structure is used, a Similarity among electronic documents is defined broadly to mean a relation between pages, including but not limited to hypertext links. Any information that characterizes a relationship between Web pages and is helpful in its classification is a Similarity. For example, a Similarity may derive from similarity in document text; a word vector may describe the distribution of word occurrences in a document, and the dot product of two word vectors may characterize the text similarity of two documents. A Similarity may also include equivalent images, audio components, or other multimedia elements. A Similarity may include equivalent component parts of URLs. A Similarity also may be based on user click information; for example, if one document is selected or clicked on often, from or following another document, then the process may determine that the documents are similar.

Thus, multiple data sources are combined to result in a best classification for a document.

The preferred process does not depend on convergence to Eigenvectors of transformation matrices. The process uses a global similarity objective function and maximizes it monotonically in each step of iterations. When the global similarity objective function is maximized, the sum of the distances between each pair of similar documents is minimized. As a result, the total sum of such distances is minimized.

The sum of the distances for a document is a confidence value or score. In a directory engine, the confidence value or score characterizes the confidence that a particular document falls within a particular category. In a search engine, the confidence value or score characterizes the relevance of a particular document to a given query. Normally, the confidence value or score would be sorted or ranked, and documents would be placed in a result set and displayed to a user according to their confidence value or score.

The preferred process has been found to obtain good results with little iteration. The process assures that in each iteration, the process monotonically approaches the optimal solution. Further, good results are obtained by computing only the relative ranking of documents, rather than the absolute values of the confidence scores.

Sources of Similarity Information

A value representing the Similarity of one document to another preferably is obtained by combining multiple sources of relevance and similarity information.

FIG. 1 is a block diagram depicting various sources of similarity information that are fed to a Similarity Objective Function 110. Elements of FIG. 1 are described further below.

1. Link similarity

Web documents, in contrast to documents in text files stored on a discrete or isolated computer, are part of an interconnected system that is used continuously by millions of people. Each day, many people may read a particular document at a Web site, and make judgments about it. It would be useful to harvest information about these judgments by observing actions taken after the judgments are made. Using this information, a system can infer measures of the similarity of any pair of documents, without necessarily considering the text contents of the documents at all.

One means of collecting such information is by observing the graph of hypertext links that connect documents available online or through the Web. Many such links are created by people based upon judgments about other electronic documents. A person may read a particular Web page and decide to make a link to it from their own Web page. In some cases, the person does this because the person judges that the page they are linking to is somehow similar to the page they are linking from. In this sense, a hypertext link indicates a form of similarity among two documents. Although similarity is highly subjective, such that not every individual judgment is useful to others, in practice it has been found that a significant number of judgments and resulting links are "useful", in the sense that the hints they provide can be distilled down and exploited to make accurate classification decisions.

As shown in FIG. 1, sources of similarity information may include hyperlink information 100, such as a graph of links between documents that point to one another.

Thus, hyperlink information may be used to help automatically classify documents. In this case, the similarity element $W_{ij}^\alpha$ is assigned the value "1" if page i and page j are linked together, and "0" otherwise. In this context, "linked together" means that either page i is pointed by or points to page j using a hypertext link. When two pages are linked in either way, they are presumed to bear similarity to each other. For other types of similarity, we may use a floating point number between negative one (−1) and positive one (1) to indicate similarity or dissimilarity.

The process of assembling hyperlink information and using it in automatic categorization of electronic documents is called "link analysis". In the preferred embodiment, multiple categories are processed at once. Accordingly, the preferred embodiment implements a process called "multi-variable link analysis". The weight ascribed to one category is dictated in part by the weight ascribed to a second category.

2. Text Similarity

As shown in FIG. 1, text information 102 may be useful to classify electronic documents for later retrieval. Most currently available Internet and Web search engines use text to determine the contents of an index that is searched.

Many kinds of text features can be used to measure similarity between documents. The preferred approach is to create and store a word vector for each document and then compare the word vectors of two documents by computing the dot product of the vectors. A word vector is a sparse vector. For example, a word vector would comprise approximately 1,000 elements for a typical document that contains 1,000 unique words, e.g., the word "computer" six times, the phrase "text classification" three times, etc. Comparing 100 million documents to one another would require about $10^{19}$ multiplication operations; using one 300 MHz processor, such computation could require on the order of $3*10^{10}$ seconds, or about 1,000 years. Therefore, a time-saving optimization is to first categorize each document and store category information in association with information about the document. For example, the categorization may be carried out using link analysis. To find textually similar documents, only documents in the same category are compared. To find dissimilar documents, only the documents in the most dissimilar categories are compared. As a result, the most similar and the most dissimilar pairs of documents tend to be obtained. For these pairs, positively weighted or negatively weighted text links are created and stored.

Assume that a hypertext system or search engine has created and stored such word vectors and they accurately describe properties of each document. The document similarity value $W_{ij}^\alpha$ is measured using either dot product or norm of difference between the two word vectors for a pair of documents.

3. Multimedia Component Similarity

Multimedia Web pages are being actively developed and placed online. Accordingly, images, audio, and other multimedia components are increasingly found in the contents of electronic hypertext documents. Unfortunately, due to the large amount of memory typically required to store files, most Web crawlers do not fetch image information at all. This is a disadvantage, because this content contains rich information that can very useful for future document retrieval and Internet search systems if an efficient way is found to reduce it into an easily manipulated set of features.

In the preferred embodiment, a crawler of a hypertext search system identifies each multimedia component in an electronic document. The crawler compresses each component into a feature vector that uniquely represents its contents. The similarity of two documents is determined by comparing the values of the feature vectors of the multimedia components they contain.

In one embodiment, feature vectors could be constructed by partial Fourier coefficients from 2-D discrete Fourier transformation, or partial wavelet coefficients from various wavelet transformations. In this approach, the feature dimensions (or number of coefficients) generated by the Fourier transformation or wavelet transformation could be very large. Therefore, a dimension reduction process, such as principal component analysis, may be performed to extract the most discriminative features to result in smaller dimensions. In addition, various other image feature selection techniques such as moment analysis, texture analysis, histogram analysis and contour and edge analysis could be used. For example, image similarity could be very useful for detecting adult content in a document, or product catalog classifications involving a catalog that contains mainly pictures of different products. Other multimedia components, such as audio or video, can also be reduced to feature vectors, between which a similarity measurement can be made.

Alternatively, the names of multimedia files, or sub-components of their names can be used to detect similarity. In the preferred embodiment, the name of the file is broken up into sub-components and a vector similar to a word vector is generated from these sub-components. Similarity of path components is highly indicative of similarity of multimedia content.

In another approach, text can be extracted from images or video by optical character recognition techniques, and used to generate word vectors.

The resulting multimedia component similarity information 104 may be used in the system of FIG. 1 to imply similarity between two documents containing similar multimedia components.

4. Click Through Similarity

Information that describes a succession of electronic documents retrieved or browsed by a particular user in an online session is known as "click through information" or simply "click throughs." User click through information is useful in determining the similarity of electronic documents. Referring again to FIG. 1, click-through information 108 may be one source of similarity information.

When a user is browsing electronic documents in an online session, the user may be viewed as an editor of a directory of documents in the Base Set. The user may use a search engine to obtain a set of search results from the Base Set. The search results comprise a list of documents that contain the words in the query, and may comprise a brief summary or abstract of each document. Normally the list of documents includes a hyperlink to each document in the list.

The user reads through the list of abstracts and selects documents that appear to match the user's needs. The user may then click through to the document by selecting a hyperlink associated with the document. Assuming that users generally click through to documents that are judged to be useful, and will not spend time on useless documents, and assuming that the user has one particular need in mind at a time, then the subset of documents that receive a click through by a particular user within a particular time window can be considered Similar.

A system or process may also observe and record the amount of time that the user spends viewing each electronic document. Since browsing electronic documents normally involves little monetary cost, users are generally sensitive to the cost in time of browsing. Thus, assuming that users spend more time on more useful pages, then when the user spends a long time browsing a particular document before returning to the results list, may indicate that the document is highly relevant to the user's needs. Conversely, if a user clicks through to a document, and then immediately selects the BACK button of a browser to return to the result set, then the system may determine that the selected document is not Similar to the user's request.

In addition, within a given time period, the user is likely to select a sequence of electronic documents that belong to the same category. The time period during which a user reviews a particular electronic document, and the sequence of pages the user visits, may be highly useful to determine the relevance and relations among the documents.

For instance, if one document is clicked often in the same time period as another, and both documents are viewed for a long period of time, the classification system may determine that the two pages are relevant to the user's interests and have Similarity. Two assumptions are made. First, the frequency at which a user changes his or her topic of interest is much slower than the frequency at which a user changes pages. Second, a user's interest in a page can be estimated by a function of the time that the user spends in viewing the page.

User click through information may be gathered and used to calculate the similarity matrix $W_{ij}^{\alpha}$. Assume that a hypertext document system includes a search engine and users who contact the search engine to request electronic documents. A first user issues a query, and the search engine returns a set of document identifiers. The user may perform one or more actions using the documents or the set of identifiers using a mouse or similar pointing device to select actions. The set of actions that are taken by the user is called a user-query session.

At another time, a second user may create another user-query session. Assume the query of the second user is the same, and returns the same set of document identifiers. As a result, two different user sessions are created and stored for the same set of documents.

In the preferred embodiment, the search engine records, for each user session, the identifiers that a user selects, and the time that the user spends viewing each selected document. This information may be used to create and store a document-by-session matrix $S(i,j)$, in which the rows of the matrix represent documents and columns represent various user sessions collected over a certain period of time. The value of one entry $S(i, j)$ represents the interest that user j has shown in document i, which is a function of the time that the user has spent viewing the page, for example.

Often, after viewing results for an initial query, the user may "refine" the initial query by changing or adding to the query keywords. Result sets corresponding to a sequence of such refined queries may be chained together to form an augmented matrix. The assumption is that the user is interested in the same topic, or and is more precisely specifying that topic, through the sequence of queries.

Once the document-by-session matrix is constructed, each row of the matrix may be chosen as a feature vector of the document, and the similarity of a pair of documents based on their feature vectors is measured. The dot product of this vector pair, for example, could serve as the similarity between the two documents. This could be expressed as $$W_{ij} = \sum_{k=1}^{N} S(i, k)S(j, k)$$

In another alternative, a probabilistic model based on two-way contingency tables is used for simultaneously clustering documents and sessions. Documents belonging to a cluster are then considered as similar, and a link is created between similar documents, which corresponds to an entry in $W_{ij}$.

5. Title Similarity

The title of an electronic document provides additional information about it and about its relevance to other electronic documents. In the case of the Web, the HTML language definition includes a tag </TITLE> which is used to encode the title of a Web page. The title information is determined by the author of the Web page and stored in its HTML source file, and is often a particularly important indication, or summary, of the contents of the document.

Title information may be stored and used in computing Similarity in the same manner as text similarity. In one embodiment, a separate similarity matrix is constructed for title information. A separate similarity matrix is desirable because the word list used to build feature vectors for title information may be different from the word list used to build a matrix for body text of an electronic document. Further, the weight ascribed to title information, and therefore the value of $f^{\alpha}$ contributed to the overall similarity matrix $W_{ij}$, could be different than the weight given to body text information.

6. URL Similarity

The location identifier of an electronic document is normally reported in search results by a search engine. In most Web search engines, a Uniform Resource Locator (URL) associated with a Web page normally is the first item of information displayed to the user for each Web page that is in the search results. Accordingly, location identifier or URL information may be useful in determining the Similarity of electronic documents, as indicated by URL Similarity information 106 of FIG. 1.

In the preferred embodiment, the URL is broken up into sub-components and a vector similar to a word vector generated from these sub-components. Similarity of path components is highly indicative of document similarity. For example, two documents from the Internet domain "www.inktomi.com" are similar in that they both come from the Inktomi Corporation web site, and may therefore both discuss information related to Inktomi Corporation. Other parts of a URL than the domain name (the first part after the "http://) can also provide important hints of similarity.

7. Cache Hit Log Similarity

Another useful source of Similarity information is log information that may be generated by a hypertext system during its operation. A specific embodiment involves obtaining Similarity information from a cache log of a Web cache system.

Generally, a Web cache is a software system that attempts to deliver recently visited Web pages from a high-speed memory storage area rather than from the original source of the Web pages, which may be slow, unavailable, or distant. An example of a carrier-class Web cache is Traffic Server, which is commercially available from Inktomi Corporation, San Mateo, Calif. Traffic Server currently is in commercial use by America Online (AOL), which is the largest Internet Service Provider (ISP) in the world.

Figure 2:
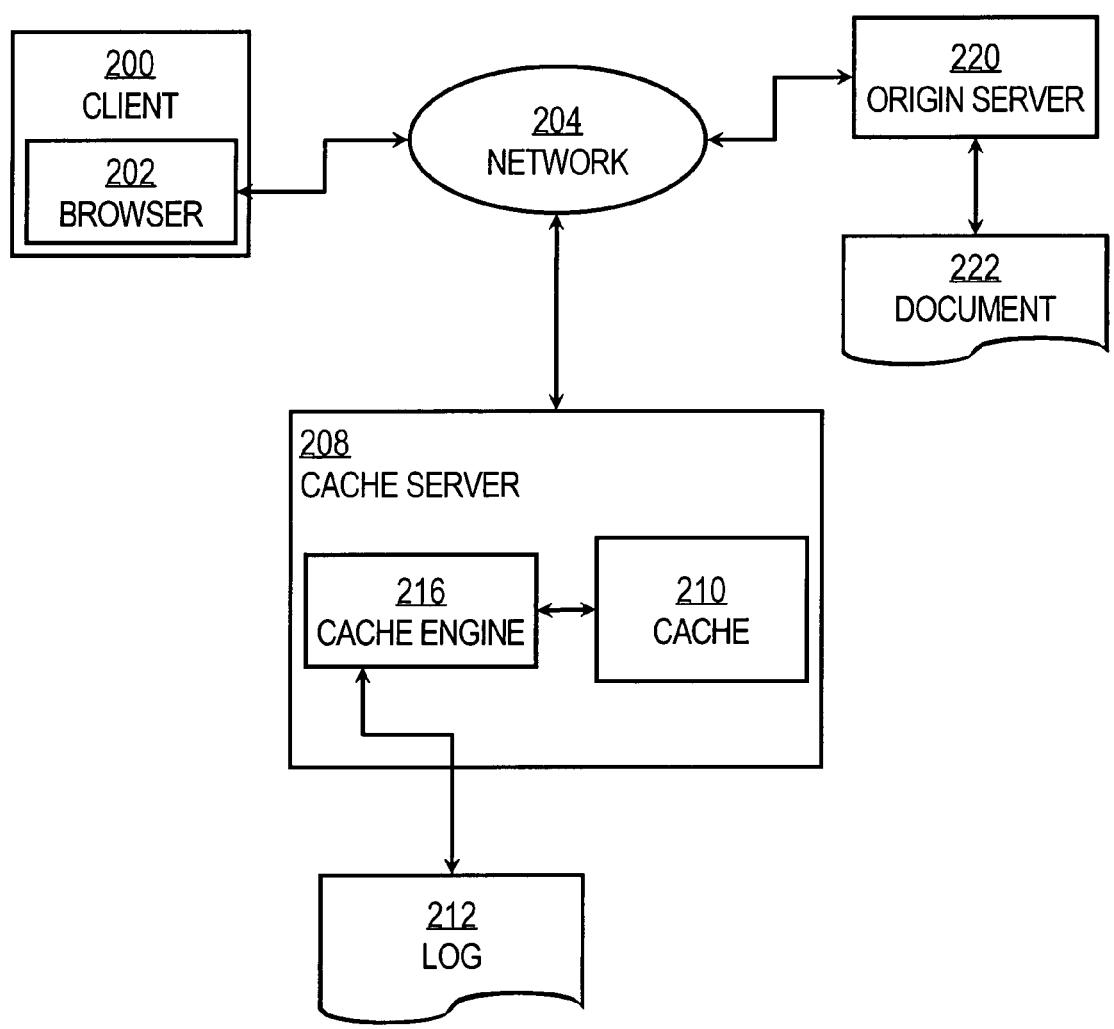
FIG. 2 is a block diagram of a cache server system.

FIG. 2 is a block diagram of the general architecture of a cache system. Client 200, which is an end station of a network such as a workstation or personal computer, executes a browser 202. The browser 202 is a software element that can request hypertext documents from a server, interpret the source language in which the hypertext documents are encoded, and display the hypertext documents. Examples of commercial products that are suitable for use as browser 202 are Netscape Navigator and Microsoft Internet Explorer.

A human user of the client 200, or an agent executing in the client, instructs browser 202 to request a hypertext document according to a particular location identifier. For example, a Web browser of the client may request a Web document using its URL. Browser 202 submits the request to cache server 208. The cache server 208 determines whether the requested document is already in the cache 210. If it is, the cache server 208 delivers the requested document to the browser 202 from the cache 210. If it is not, cache server 208 uses a domain name service or similar network element of network 204 to determine the location of origin server 220. Cache server 208 then requests the document from origin server 220, via network 204. Finally, cache server 208 stores a copy of the document in cache 210, and passes a copy of the document back to browser 202. Thus, normally, all Web traffic directed from browser 202 passes through the cache server 208. The cache server is thereby in the ideal position to log users' requests for various Web documents.

As part of its normal operation, the cache creates and stores one or more logs, including log 212, which contain a record for each document request. Each log may be implemented as a file stored in a file system on a non-volatile storage file, a list in memory, or any other appropriate data structure or information storage mechanism.

In the preferred embodiment, each log record comprises a Time value, a User ID value, and a Location Identifier value. The Time value represents the time at which a document retrieval request occurred. The Time value acts as a timestamp for the record. It may be stored in Greenwich Mean Time format. The User ID value can represent either an individual person who requested an electronic document, or it can represent the workstation that the individual is using. In one embodiment, the User ID value is an Internet Protocol address (IP address) of the requesting client. The Location Identifier represents the name or location of the electronic document that was retrieved.

TABLE 1 depicts an example of the possible contents of a log 212.

TABLE 1—Example Contents of Log

Time, User ID, Location Identifier

FIG. 6 shows TABLE 1, which depicts an example of the possible contents of a log 212.

In this example, each record in the log 212 represents a request to access a particular document by a particular user at a particular moment in time. The log is created sequentially and chronologically, moving forward in time. Thus, each record has a successively increasing Time value, whereas the values of the User ID and Location Identifier depends on which User ID requests which document at a particular time.

Assuming that human users do not browse electronic documents randomly, it may be inferred that all documents retrieved or browsed by a particular user within a particular time period are Similar. The information derived from a cache log is particularly useful because it is based on all documents visited by users on the Web, not just those that appear in a result set from a search engine. Further, the information derived from such logs is more timely than information based on search engine results. In the case of the Web, the popularity of a particular hypertext document may vary greatly in a short time. Such changes in popularity are reflected rapidly in the logs. A search engine, however, may take several weeks to carry out a "refresh crawl" of the entire Web. New documents are not incorporated into the indices of the search engine until the next crawl cycle. Further, human users add their own hypertext links to electronic documents at a fairly slow rate. Thus, the cache logs are unique in their timeliness and breadth of coverage.

To extract Similarity information, in the preferred embodiment, a matrix is constructed having columns that represent the set of known documents, and having rows that represent a user session. For example, one row has entries for every document that a user has viewed within a session. In this context, "session" refers to a time period within which it is assumed that the user has one topic in mind. This time period is empirically derived for a given group of users. Based on a of documents that are known to be similar, and user behavior can be observed to determine the appropriate attention span for that user population. If this time period is too long, it cannot be said with confidence that successively retrieved documents are similar, because the user may have formulated a new search objective with the passage of time. The elements in this matrix represent the interest that the user is judged to have in the document clicked. This is a function of the time that the user spent viewing that page. This function is also empirically derived by watching the behavior of a population of users for a known set of documents.

The columns of this matrix may be compared to determine the similarity of the documents corresponding to the columns. Documents with similar patterns of user interest can be inferred to contain similar content. In addition, documents that an individual user is highly interested during the span of the user's attention to one topic may also be inferred to be similar. If all pairs of columns i and j are compared with each other, a second matrix $W_{ij}$ can be derived, for which the elements represent the similarity of document i and j as implied by the entries in the cache log. In the preferred embodiment, the comparison of the columns is done by taking their dot product. In another embodiment, the arithmetic difference is taken.

Rows of the matrix, which represent user sessions, can also be compared to profile users, and determine similarity of pairs of users. This can be useful for targeted sales and marketing purposes.

Extracting Link Information

Analysis of hyperlink information requires an organized process of extracting a graph of links from a large database of electronic documents. In the preferred embodiment, a link graph is created and stored from the hypertext documents based on the links that are extracted from them. In an embodiment, the graph comprises a plurality of nodes. Each node is a pair of hash values, in which each hash value represents a Location Identifier. In one embodiment, the hash values are computed using the MD5 hash algorithm, which generates output values having a fixed bit length. In the preferred embodiment, the graph comprises three main parts. A first part is a data file which, for each hash that represents a first document, contains a list of all other hashes which represent documents that link to the first document; and a list of all other hashes which represent documents that are linked to by the first document. A second part is a URL file containing, for each hash, the URL from which it was generated (in order that one can map back from the hash to the URL). A third element is an index file, which lists all hashes in the graph, and for each hash pointer into its corresponding records in the data file, and the URL file.

Combining Multiple Sources of Similarity Information

Referring again to FIG. 1, each of the sources of similarity information 100, 102, 104, 106, 108, represented as a graph of links, is fed into a combination function 130 to produce a combined graph 140. This graph represents our idea of general similarity of documents taking into account many factors. In one implementation, this combination function make take the union of the separate graphs to produce the combined graph; i.e., if two documents are similar in terms of any of the different features, we consider them similar in the combined sense. In another implementation, the combination function make take the intersection of the separate graphs to produce the combined graph; i.e., a document must be similar in terms of all of the different features to be considered similar in the combined sense. Other combination functions are possible, depending on the nature of the features considered and the desired outcome.

The combined similarity graph 130 and the similarity objective function 110 are used to compute a generalized similarity value 120 for two exemplary documents 112, 114 that are stored in a hypertext system.

Documents 112, 114 are shown by way of example, and the processes and mechanisms described herein may be applied to any number of documents. The resulting generalized similarity value 120 is used in a variety of ways. In an embodiment, the generalized similarity value 120 is used to determine the proper category, among a taxonomy of categories in an index, cache or search system, into which documents 112, 114 belong.

Computing the Global Similarity Objective Function

1. Foundation Concepts

For the purposes of clarity in the following description, assume that a hypertext system comprises a large group of electronic documents, called the Base Set. Within the Base Set, there is a subset, called a Training Set, of electronic documents that are known to be well classified within directory categories or well labeled with respect to contents. In this configuration, the basic problem addressed by the preferred embodiment is how to select documents in the Base Set that have Similarity to documents in each category of the Training Set, and how to rank the selected documents according to relevance to the categories in which they have been placed. For simplicity, assume that the Training Set comprises only one Category; extension of the process to multiple categories is straightforward.

According to the preferred embodiment, a Similarity Reinforcement process is carried out, based on optimization of a pre-defined global similarity objective function. The global similarity objective function is a way of combining and synthesizing Similarity information that is obtained from multiple sources. The function is termed "global" because combines numerous information sources into one value. The function is termed "objective" because it yields a numeric value that represents Similarity.

The global similarity objective function may be written as:

$$P(x) = \sum_{i,j=1}^{N} W_{ij} x_i x_j \quad \text{(II-1)}$$

wherein the following definitions apply. One Category of electronic documents is assumed. The expression $\{x_i >= 0, i=1, 2, \ldots, N\}$ represents the confidence values or scores for each electronic document in the Base Set that is classified in the Category. The size of the Base Set is N documents. The Similarity matrix is $\{W_{ij} >= 0, W_{ij} <= Wm, i, j=1, 2, \ldots, N\}$. The matrix variable $W_{ij}$ represents the strength of the Similarity between document i and documents The positive number Wm is the upper bound of a value of an element of the Similarity matrix.

It is assumed that the total sum of the confidence scores is a constant, that is, $$\sum_{i=1}^{N} x_i = c > 0 \quad \text{(II-2)}$$

Accordingly, the objective function P(x) is upper bounded by $c^2$ Wm and the optimization process becomes a maximization process.

A large value of the matrix variable $W_{ij}$ means that document i and document j are strongly similar to one another, and if $W_{ij}$ is zero, then document i and document j do not relate to one another at all.

The whole system together with its training process is similar to a relaxation system of the type used in the field of physics, such as simulated annealing or random field relaxation.

Here, the whole system consists of N elements and they interact with each other through the interaction force. If the classification confidence scores $\{x_i >= 0, i=1, 2, \ldots, N\}$ represent the mass of the each element in the system and the similarity matrix $\{W_{ij}, i, j=1, 2, \ldots, N\}$ represents the interaction force between each pair, the function $$P(x) = \sum_{i,j=1}^{N} W_{ij} x_i x_j$$

would represent the total "interaction energy" in the system. Each term in the summation represents the interaction energy from the contribution of one pair. The system obeys the mass conservation law:

$$\sum_{i=1}^{N} x_i = c.$$

However, the total interaction energy can increase through the interaction process. Initially, there are some elements serving as the "seeds" (with nozero mass). And, the other elements which have interaction with them but with less mass or zero mass will absorb some mass from the seeds. The stronger the interaction is, the more mass would be transfered. Eventually, the total energy reach maximum and the mass is distributed among seeds and the elements which have stronger interaction with the seeds.

$W_{ij}$ may represent the combination of multiple sources of Similarity hints (e.g., text similarity, link similarity). In the preferred embodiment, the value of the elements of the combined matrix $W_{ij}$ may be determined by:

$$W_{ij} = f(W_{ij}^1, W_{ij}^2, \ldots, W_{ij}^n) \qquad (\text{II-3})$$

The value $W_{ij}$ is the combined similarity between document i and documents, and is some function $f$ of the various individual types of document similarity between the two documents represented by $W_{ij}^1$ to $W_{ij}^n$—for example, text similarity, link similarity, etc. The function $f$, in one embodiment, may take the union of the nonzero elements of a pair of similarities $W_{ij}^1$ and $W_{ij}^2$, or in another embodiment, it might take the intersection of the nonzero elements of a pair of similarities $W_{ij}^1$ and $W_{ij}^2$. The function $f$ that is chosen will depend on the character of the similarities being combined and the desired result.

2. Implementation Method

Figure 3A:
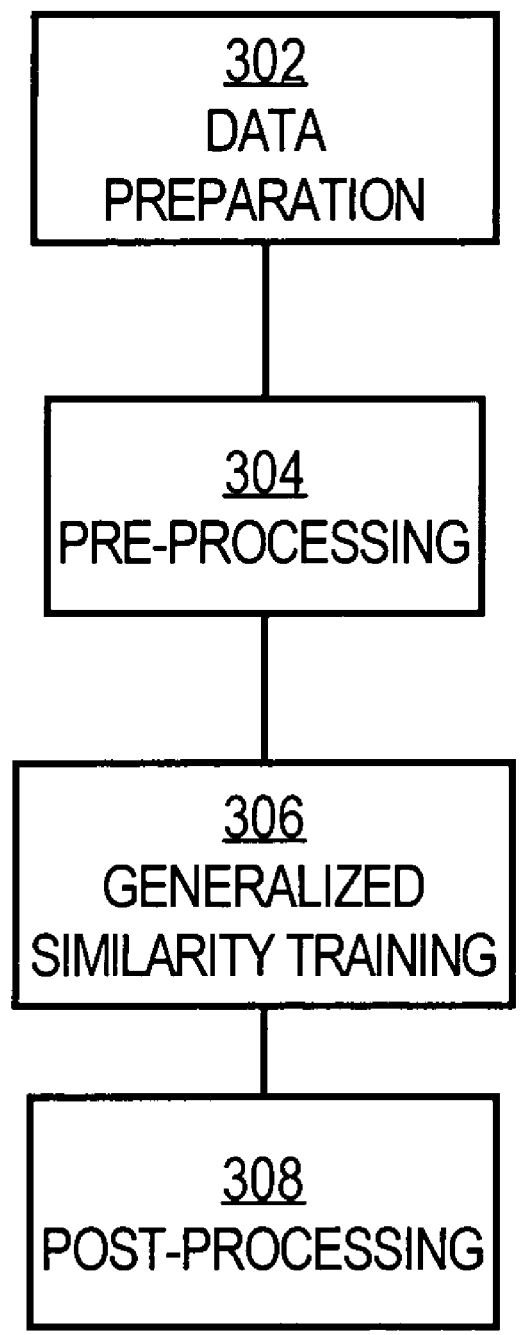
FIG. 3A is a flow diagram of a method of computing a Similarity value using a global similarity objective function.

FIG. 3A is a flow diagram of a method of computing a Similarity value using a global similarity objective function.

For purposes of clarity, implementation of the method is illustrated by an example in which only text similarity and hyperlink similarity are used, and the gradient search algorithm is employed. Generally, the method includes four major steps, namely the Data Preparation step 302, Preprocessing step 304, Generalized Similarity Training step 306, and Post Processing step 308.

The Data Preparation Step 302 creates individual Similarity Matrices of different types, combines them into a Combined Similarity Matrix. This is described in further detail below in the discussion of FIG. 3B.

The Pre-processing step 304 has the goal of calculating one or more Similarity Matrices for different types of similarity, such as text similarity and hyperlink similarity, and combining these matrices using the combination function to calculate the Combined Similarity Matrix.

The Generalized Similarity Training step 306 takes documents in the training set of each category, essentially finds similar documents to them, and classifies the similar documents into the category. An embodiment is described further in the section below labeled "TRAINING PROCESS".

The Post-processing step 308 may generally involve clean up of the results by heuristic methods that have been found in practice to improve results somewhat. For example, Post-processing step 308 may involve removal of too many documents coming from the same host machine on the Internet, and removal of documents that have been determined to be "spam" documents by a wide variety of heuristic methods.

Figure 3B:
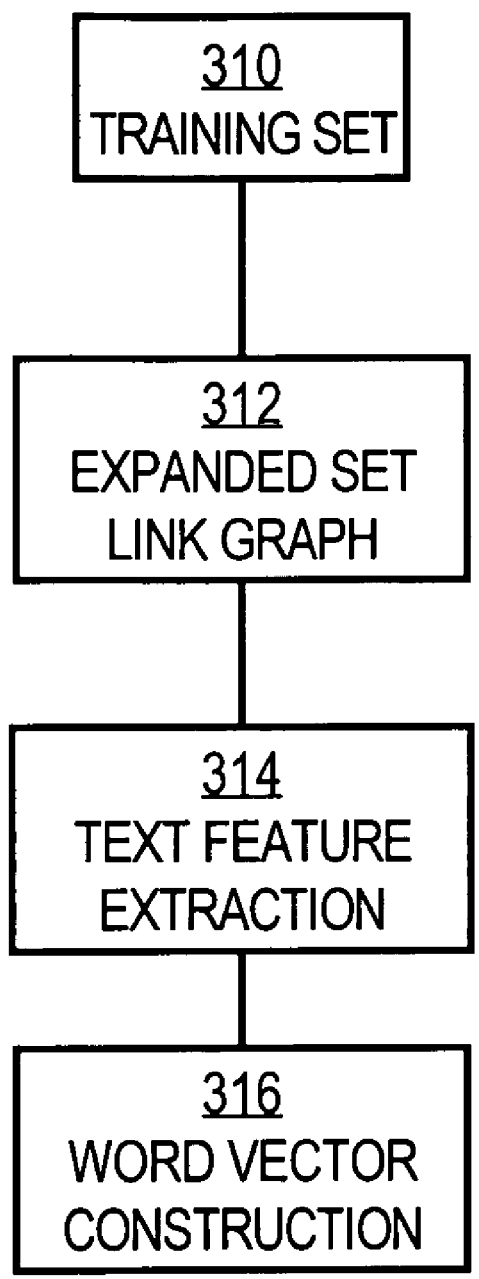
FIG. 3B is a flow diagram of a method of carrying out a data preparation step.

FIG. 3B is a block diagram of steps that may be involved in an embodiment of Data Preparation step 302. In block 310, a training set is created. The training set comprises a small set of electronic documents that are determined to closely match each category of a taxonomy. For example, about ten (10) electronic documents may be selected from Web sites and assigned to each leaf or category. The total size of the training set may be large. For example, assume that a category taxonomy has 5,000 categories or nodes; the training set would have about 50,000 electronic documents. Each document in the training set is marked with categories it belongs to. One document may belong to more than one category.

Next, data used in Generalized Similarity Analysis is generated. For purposes of describing an example, assume that two types of data are used to determine similarity, namely hyperlinks among the documents in the training set, and extracted text features. A hyperlink graph is extracted from the documents and constructed in memory based on an expanded set of documents. The expanded set of documents is created by expanding the training set to include all the documents that the training documents point to or that point to the training set documents. A link graph is created and stored to represent the link relationship among all documents in the expanded set, as indicated by block 312.

In block 314, using the text contents of each document, possible single- and multiple-word phrases are extracted from the documents. From a training set of 50,000 documents, after expansion into the expanded set, about two million phrases may be derived. Feature analysis and extraction is also carried out on the documents. The text feature analysis and extraction are done using linguistic information about word types, and information gained from analysis of the known categorization within the training set.

A subset of the features that most strongly discriminate documents in one category from documents in another category are selected. For example, based on two million features, about one-half million most discriminative features or word phrases may be chosen. As shown in block 316, word vectors or feature vectors are constructed for each document in the expanded set. Each component of the feature vectors is the normalized value of the occurrence frequency of a particular feature in this document.

Training Process

1. Foundation Concepts

After one or more similarity matrices are constructed, for use in Equation (II-3) as set forth above, a training algorithm is applied to maximize the objective function P(x). Use of a training algorithm may be used in Generalized Similarity Training step 306 of FIG. 3A. In embodiments, several different training algorithms may be used. In the preferred embodiments, a gradient ascent learning algorithm or a growth transformation algorithm is applied.

A preferred gradient ascent algorithm has been derived by taking the partial derivatives of P(x) over each $x_i$ under constraint of $\Sigma x_i = 1$ and $\{x_i \geq 0, i=1, 2, \ldots, N\}$. The principle of this algorithm is to search the local maximum along the direction parallel to the gradient $\nabla P(x)$ on the constrained space of x with these N+1 constraints.

Without constraints, the usual gradient search algorithm is represented as $\Delta x \propto \nabla P(x)$, or $$x_i^{k+1} = x_i^k + \eta \frac{\partial P(x)}{\partial x_i} \qquad (\text{II-5})$$

where $x_i^k$ means the $k_{th}$ iteration and $i_{th}$ component of x $\eta > 0$ is the learning rate, and $\partial P(x)/\partial x_i$ is the partial derivative of the objective function P(x) with respect to its variable $x_i$.

When there are constraints, the generalized objective function is $$Q(x) = P(x) + \sum_{i=1}^{M} \lambda_i B_i(x) \quad \text{(II-6)}$$

where each $B_i(x)$ represents one of the active constraints of $\Sigma x_i=1$, and $\{x_i\geq 0, i=1, 2, \ldots N\}$ and $\lambda_i$ are Lagrangian multipliers.

The values of the Lagrangian multipliers are determined by the Kuhn-Tucker theorem, which requires that the gradient $\nabla Q(x)$ is orthogonal to each $\nabla B_i(x)$, $i=1, 2, \ldots, M$, and then the search is along $\Delta x \propto \nabla Q(x)$. This procedure works for general constrained problems, especially for the cases where the objective function $P(x)$ is not well defined beyond the constraints. In the present system, the problem is expected to be simpler. First, as defined, the objective function $P(x)$ has positive gradient $\nabla P(x)$ along all directions, therefore directly using the unconstrained algorithm Equation (II-5) would automatically guarantee all the N constraints $\{x_i \geq 0, i=1, 2, \ldots, N\}$. Therefore, the only active constraint in Equation (II-6) is $\Sigma x_i=1$. However, because the quadratic function crosses the constraint boundary $\Sigma x_i=1$, the new values of x may be computed by applying Equation (II-5), even if $\Sigma x_i=1$ is not satisfied by the new x, and by normalizing it to $\Sigma x_i=1$ afterwards.

Therefore, the preferred gradient algorithm is $$x_i^{k+1} = \left( x_i^k + \eta \frac{\partial P(x)}{\partial x_i} \right) / \sum_i \left( x_i^k + \eta \frac{\partial P(x)}{\partial x_i} \right) \quad \text{(II-7)}$$

The efficiency of gradient learning algorithms depends on the choice of learning rate $\eta$. When the data is expected to be relatively uniform, a larger value for the learning rate may be chosen, which will speed up the learning. Normally, the gradient algorithm is valid only if the changes of both x and $P(x)$ are infinitesimally small in each step. Using finite learning steps does not guarantee convergence to the optimal point, namely, the local maximum of $P(x)$.

The Growth Transformation algorithm does converge to the optimum with a finite step in each iteration. Growth Transformation algorithms have been applied in the past to maximizing the constrained polynomial objective function, and re-estimation of statistical model parameters of hidden Markov models. An advantage of Growth Transformation is that it guarantees the monotonic increase of the objective function in a finite step, instead of infinitesimal step as most gradient algorithms do.

The mathematical proof and derivation of the preferred Growth Transformation is complex and is omitted for clarity. The preferred Growth Transformation algorithm is:

$$x_i^{k+1} = \frac{x_i^k \frac{\partial P(x^k)}{\partial x_i^k}}{\sum_i x_i^k \frac{\partial P(x^k)}{\partial x_i^k}} \quad \text{(II-8)}$$

In the description above, as an example to illustrate the Similarity concept and derivation of algorithms, only one Category of electronic documents has been assumed. However, the Similarity Reinforcement approach described herein is easily generalized to multiple categories. Assuming that there are C Categories, the objective function is $$P(x) = \sum_{\beta=1}^{C} \sum_{i,j=1}^{N} W_{ij} x_{i\beta} x_{j\beta} \quad \text{(II-9)}$$

where $x_{i\beta}$ is the confidence score of $i_{th}$ document belonging to the $\beta$ category.

2. Implementation method

This is the major step of the Generalized Similarity Analysis. The goal is, for each document in the expanded set, to generate the classification confidence scores for each category: $X(j, k)$, $j=0, 1, \ldots N-1$, $k=0, 1, 2, M-1$, where N is the total number of categories and M the total number of documents in expanded set. The input is the training set (with its classification information marked) and the generalized similarity matrix, $W(k, m)$, $k, m=0, 1, 2, M-1$. Since $W(k,m)$ is a sparse matrix, we only allocate memory for the non-zero elements. During training, the equation of (II-5) is iteratively updated for each category and all documents. And, finally the classification scores are generated.

Figure 4:
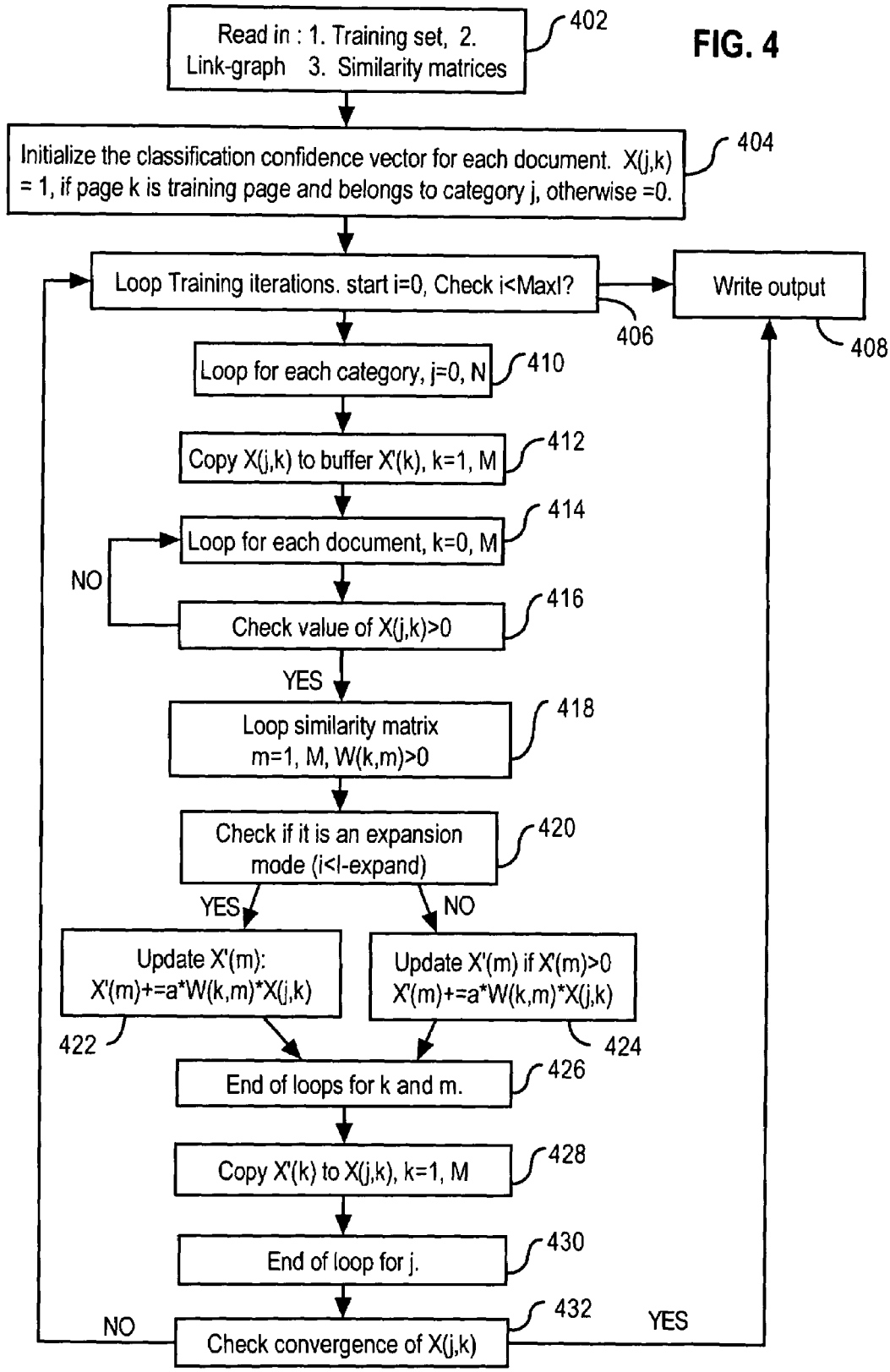
FIG. 4 is a flow diagram of a method of carrying out generalized similarity training.

FIG. 4 is a flow diagram of a method of computing a Similarity value using a similarity reinforcement training process.

Generally, the method is directed toward generating, for each document in the expanded set, classification confidence scores for each category according to the relation $$X(j, k), j=0, 1, \ldots N-1, k=0, 1, 2, M-1$$

where N is the total number of categories and M the total number of documents in expanded set. The input is the training set, with its classification information marked, and the generalized similarity matrix, $W(k, m)$, $k, m=0, 1, 2, M-1$. Since the generalized similarity matrix is a sparse matrix, it is sufficient to allocate memory only for the non-zero elements. During training, stored values that implement equation (II-5) are iteratively updated for each category and all documents. As a result, classification scores are generated.

Referring now to FIG. 4, in block 402, the process reads the training set, the link graph, and the similarity matrices are read into memory. This may involve reading these elements from one or more disk files.

In block 404, a classification confidence vector for each document is initialized. In one embodiment, the classification confidence vectors are represented as $X(j, k)=1$ if page k is a training document that belongs to category j; otherwise the vector element is set equal to In block 406, a loop is entered to carry out training iterations. A counter variable i is initialized to "0". Block 406 also involves testing whether the value of i is less than a pre-determined maximum. If not, then training is complete, and the output is written to storage, as indicated by block 408.

In block 410, a loop is entered for each category. The purpose is, for a given category j, to update the score values $x(j, k)$, for all documents, $k=0, 1, 2, M-1$. In block 412, the current value of $x(j, k)$ is copied to a buffer $x'(k)$ that represents the updated new values. At block 414, a loop is entered for all the documents $x(j, k)$ in this category. If the value of $x(j, k)$ is zero, as tested in block 416, it will not affect other documents; therefore, control is passed back to block 414, in effect skipping all the documents with $x(j, k)=0$.

For each non-zero valued document, as shown in block 418, the process checks how many non-zero similarity elements it has. This non-zero similarity would cause the score to change for documents it is connected with, in such a way that $x'(m)=x'(m)+a*W(k,m)*x(j,k)$, where a is a predefined "learning rate". However, because the process provides simultaneous training for all categories, such that the whole document set contains "one-hop away" documents from the training set that contains all categories, two alternating processes are used, as indicated by block 422 and block 424. One process is the expanding process, where each training document will transfer its scores to every pages that linked with it, as shown by block 422. After the expanding stage, there is an updating step, in which only the scores for the documents that have already non-zero scores are updated. This is because the pages having zero scores are not "one hop away" from the training set of current category but "one hop away" from other categories.

After the loop for all categories, a "convergence check" is carried out in block 432, in order to compare the difference between the new values and old values. The relative difference is used, that is, the total sum of absolute changes divided by the total sum of old values. If the relative difference is smaller than the predefined percentage value, say 1%, the system is considered converged and the training process terminates.

Hardware Overview

Figure 5:
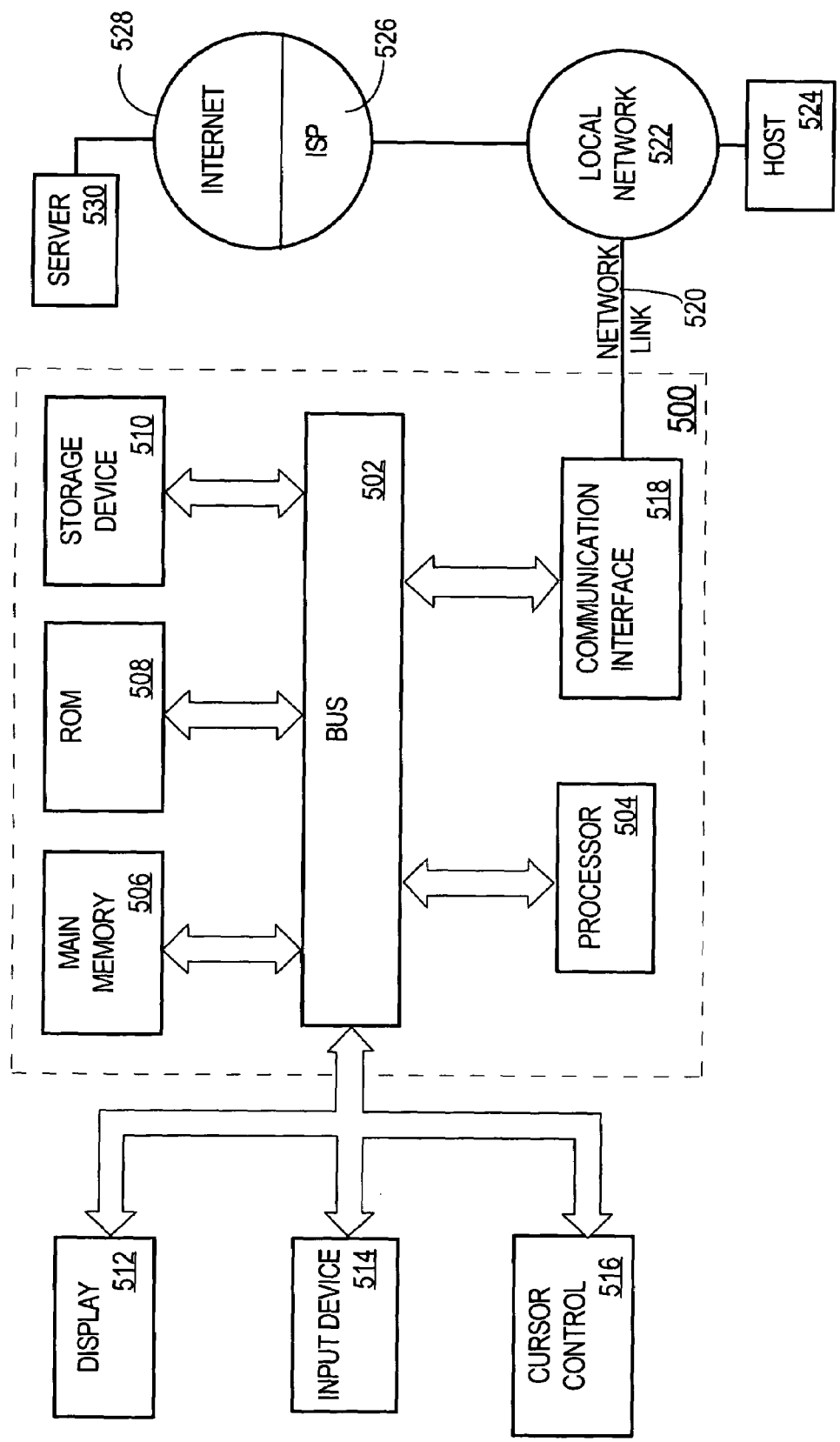
FIG. 5 is a block diagram of a computer system with which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for determining when electronic documents are similar. According to one embodiment of the invention, determining when electronic documents are similar is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector can receive the data carried in the infrared signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for determining when electronic documents are similar as described herein.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method of categorizing a plurality of new electronic documents into a set of categories, comprising the steps of:
    establishing a plurality of training sets, wherein each training set is associated with a category and includes training documents that have been classified as belonging to said associated category;
    determining how strongly each document of said plurality of documents corresponds to each of said plurality of categories by determining similarity between said each document and the training documents that belong to the training set of said category; and
    wherein the step of determining similarity is performed using a matrix representing document similarity that is derived by combining two or more measures of document similarity.

2. A method as recited in claim 1, wherein the measures of document similarity include hyperlink similarity.

3. A method as recited in claim 2, in which two documents among the plurality of documents are considered similar to each other when there is a link from one to the other, or when the two documents link to, or are linked to by, a set of other associated documents.

4. A method as recited in claim 3, in which certain hyperlinks have greater or lesser similarity weight than other hyperlinks, based on other features of the links or their source or destination documents.

5. A method as recited in claim 1, wherein the measures of document similarity include a similarity of text of the documents.

6. A method as recited in claim 5, wherein two documents are considered similar based on a comparison of word vectors derived from the text of each of the two documents.

7. A method as recited in claim 5, wherein text similarity is determined in part based upon weight values assigned to words of the text, and wherein certain words have greater or lesser weight than other words.

8. A method as recited in claim 1, wherein the measures of document similarity include user click-through similarity.

9. A method as recited in claim 8, wherein two documents are considered similar based on user click-through similarity when the documents are associated with similar patterns of user click behavior, selected from among frequency of clicks, click context, duration of viewing, proximity in time to other clicks, or proximity in context to other clicks.

10. A method as recited in claim 1, wherein the measures of document similarity are derived from patterns detected in user viewing of the documents.

11. A method as recited in claim 10, wherein the user viewing information is monitored by a web caching system and stored in a log.

12. A method as recited in claim 10, wherein two documents are considered similar based on patterns of user viewing behavior, including frequency of viewing, viewing context, duration of viewing, proximity in time to other documents viewed by the same user, or similarity of patterns of viewing by all users.

13. A method as recited in claim 1, wherein the measures of document similarity include URL similarity.

14. A method as recited in claim 13, wherein two documents are considered similar if a URL of each document contains similar URL sub-components.

15. A method as recited in claim 1, wherein the measures of document similarity include multimedia similarity.

16. A method as recited in claim 15, wherein two documents are considered similar based on features derived from multimedia components linked to or contained by the documents.

17. A method as recited in claim 1, wherein the combination of two or more measures of document similarity is achieved by taking the union of each of a plurality of graphs, each graph describing one of the measures of document similarity, to compute a combined graph that describes the combined document similarity.

18. A method as recited in claim 1, wherein the combination of two or more measures of document similarity is achieved by taking the intersection of each of a plurality of graphs, each graph describing one of the measures of document similarity, to compute a combined graph that describes the combined document similarity.

19. A method as recited in claim 1, further comprising the step of extracting similarity information from the similarity matrix to obtain new documents supported by the set of training documents for each category.

20. A method as recited in claim 19, wherein the similarity information is obtained by optimizing an objective function.

21. A method as recited in claim 19, wherein the similarity information is obtained by only approximately optimizing an objective function.

22. A method as recited in claim 21, wherein approximately optimizing the objective function comprises repeated application of a growth transformation.

23. A method as recited in claim 19, further comprising the step of creating and storing a second matrix that represents an interim score for each document in each category.

24. A method as recited in claim 19, further comprising the steps of, periodically as the matrix is being computed, normalizing rows of the matrix by normalizing within each document, across all categories, whereby the score for one document in a particular category will depend on the scores for that document in all other categories.

25. A method as recited in claim 19, further comprising the steps of, periodically as the matrix is being computed, normalizing columns of the matrix by normalizing within each category, across all documents, whereby the score for one document in a particular category depends on the scores for all other documents in that category.

26. A method as recited in claim 1, in which the categories come from a manually defined taxonomy.

27. A method as recited in claim 1, wherein the categories are derived from logs of user queries.

28. A method as recited in claim 1, further comprising the steps of creating and storing a second matrix using columns representing documents and rows representing user sessions, and wherein values of elements of the second matrix represent interest in a document shown by a particular user in a particular session.

29. A method as recited in claim 1, further comprising the steps of creating and storing a matrix using columns representing user sessions and rows representing documents, and wherein values of elements of the second matrix represent interest in a document shown by a particular user in a particular session.

30. A method as recited in claim 28, wherein the element values are computed as a function of a time that a user has spent viewing a document associated with each element.

31. A method as recited in claim 28, further comprising the steps of creating and storing a second matrix representing a Similarity between pairs of documents i and j, wherein the second matrix is derived by comparing pairs of column vectors or row vectors, respectively i and j of the first matrix.

32. A method as recited in claim 28, further comprising the steps of creating and storing a second matrix representing a Similarity between pairs of documents i and j, by finding pairs of documents i and j which have high interest values for a particular user in a particular session or period of time.

33. The method recited in claim 1, further comprising the steps of:
   identifying a category of a classification taxonomy of the hypertext system in which a first electronic document is presently classified; and
   if a second electronic document is found to be highly Similar, storing information that classifies the second electronic document into the category.

34. A computer-readable recording medium carrying one or more sequences of instructions, wherein execution of the one or more sequences of instructions by one or more processors causes the one or more processors to perform the steps of:
   establishing a plurality of training sets, wherein each training set is associated with a category and includes training documents that have been classified as belonging to said associated category;
   determining how strongly each document of said plurality of documents corresponds to each of said plurality of categories by determining similarity between said each document and the documents that belong to the training set of said category; and
   wherein the step of determining similarity is performed using a matrix representing document similarity that is derived by combining two or more measures of document similarity.

\* \* \* \* \*